(12) United States Patent
Onishi et al.

(10) Patent No.: US 6,544,684 B2
(45) Date of Patent: Apr. 8, 2003

(54) PRISMATIC BATTERY AND METHOD OF MANUFACTURING SAME

(75) Inventors: Masato Onishi, Toyohashi (JP); Hideo Asaka, Kosai (JP); Hiroshi Nagata, Toyohashi (JP); Noriyuki Fujioka, Kosai (JP); Shinji Hamada, Toyohashi (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 29 days.

(21) Appl. No.: 09/825,987

(22) Filed: Apr. 5, 2001

(65) Prior Publication Data

US 2001/0041288 A1 Nov. 15, 2001

(30) Foreign Application Priority Data

Apr. 18, 2000 (JP) ........................... 2000-116382

(51) Int. Cl.⁷ .............................................. H01M 10/40
(52) U.S. Cl. .................. 429/146; 429/139; 429/162
(58) Field of Search .................... 429/146, 139, 429/162

(56) References Cited

U.S. PATENT DOCUMENTS

| | | | | |
|---|---|---|---|---|
| 3,981,742 A | * | 9/1976 | Yonezu et al. | |
| 5,401,595 A | * | 3/1995 | Kagawa | 429/152 |
| 5,871,861 A | * | 2/1999 | Hirokou et al. | |
| 6,187,062 B1 | * | 2/2001 | Oweis | 29/623.1 |
| 6,193,765 B1 | * | 2/2001 | Nakanishi | 29/623.1 |
| 6,284,408 B1 | * | 9/2001 | Akazawa | 429/211 |
| 6,475,667 B1 | * | 11/2002 | Onishi | 429/161 |

FOREIGN PATENT DOCUMENTS

| | | | | |
|---|---|---|---|---|
| EP | 0646980 | * | 9/1994 | .......... H01M/10/04 |
| EP | 1104040 | * | 11/2000 | .......... H01M/10/40 |
| EP | 1148569 | * | 4/2001 | .......... H01M/10/04 |
| FR | 2370368 | * | 6/1978 | |
| JP | 58-18882 | * | 2/1983 | |
| JP | 62-278771 | * | 12/1987 | |
| JP | 5-39585 | | 7/1988 | |
| JP | 2-299171 | * | 12/1990 | |
| JP | 6-54208 | | 7/1994 | |

OTHER PUBLICATIONS

English Language Abstract of JP 5–39585.
English Language Abstract of JP 6–54208.
English Language Abstract for FR Appln. No. 2370368.*
English Language Abstract for JP Appln. No. 62–278771.*
English Language Abstract for JP Appln. No. 58–18882.*
English Language Abstract for JP Appln. No. 2–299171.*

* cited by examiner

*Primary Examiner*—Patrick Ryan
*Assistant Examiner*—Mark Ruthkosky
(74) *Attorney, Agent, or Firm*—Greenblum & Bernstein, P.L.C.

(57) ABSTRACT

Positive and negative electrode plates 2, 3 are alternately stacked upon one another with intervening separators 4 to constitute an electrode plate group 1. The respective electrode plates are laterally offset so that side edges of the electrode plates protrude on the opposite sides. Collector plates 5, 6 are perpendicularly welded to the side edges of the electrode plates 2, 3 on both sides of the electrode plate group 1. Loose ends 3c, 3e of the outermost negative electrode plates 3b, 3d that are not welded to the collector plate are secured to the electrode plate group by a holding tape 7.

8 Claims, 7 Drawing Sheets

PRISMATIC BATTERY AND METHOD OF MANUFACTURING SAME

BACKGROUND OF THE INVENTION

The present disclosure relates to subject matter contained in priority Japanese Patent Application No. 2000-116382, filed on Apr. 18, 2000, the contents of which is herein expressly incorporated by reference in its entirety.

1. Field of the Invention

The present invention relates to a prismatic battery and a method of manufacturing same.

2. Description of Related Art

For batteries having a prismatic shape, a structure may be adopted wherein rectangular positive and negative electrode plates are alternately stacked with intervening separators therebetween and collector plates of opposite polarities attached on the opposite sides of the group of electrode plates. After stacking the electrode plates upon one another, they must be tightly bundled together during the succeeding process steps so as to prevent any foreign substances from entering between the electrode plates. Particularly, molten metal particles are sputtered around the electrode plates during the welding of collector plates, and such conductive foreign substance causes short circuits across the positive and negative electrode plates.

In the past, the electrode plates, after being assembled into a group, had to be carefully inserted into a case so that the electrode plates will not be displaced, or that the active material coated on the electrode plates will not be scraped by the open end edge of the case.

SUMMARY OF THE INVENTION

In view of the problems encountered by the prior art, it is an object of the present invention to provide a prismatic battery and a manufacturing process for same, in which there is no risk that conductive foreign substances enter between stacked electrode plates.

To achieve the above-mentioned object, the present invention provides a prismatic battery, including a battery case for accommodating an electrode plate group and a liquid electrolyte therein. The electrode plate group includes a plurality of positive electrode plates and a plurality of negative electrode plates stacked alternately with intervening separators therebetween. The positive electrode plates and the negative electrode plates are laterally offset from each other so that side edges of the positive electrode plates protrude on one side and side edges of the negative electrode plates protrude on the other side of the electrode plate group. A first collector plate is joined perpendicularly to the side edges of the positive electrode plates on one side of the electrode plate group, and a second collector plate is joined perpendicularly to the side edges of the negative electrode plates on the other side of the electrode plate group. A tape is attached to part of the electrode plate group, at least bridging a loose end of an electrode plate positioned outermost of the electrode plate group and one of the first collector plate and the second collector plate.

The tape may be attached to the electrode plate group such as to stretch from the loose end of the outermost electrode plate on one side of the electrode plate group over one of the first and second collector plates to the loose end of the outermost electrode plate on the other side of the electrode plate group. Alternatively, the tape may be wound entirely around the electrode plate group to surround the outermost electrode plates and the collector plates.

A second tape may additionally be attached to the electrode plate group in the vicinity of the loose end of the outermost electrode plate, stretching from a bottom end of one outermost electrode plate over a bottom end face of the electrode plate group to a bottom end of the other outermost electrode plate.

Alternatively, a tape may be vertically wound around the electrode plate group in the vicinity of the loose end of the outermost electrode plates, so that the loose ends of the outermost electrode plates are securely held, as well as the bottom end face of the electrode plate group is duly protected by the tape.

While novel features of the invention are set forth in the preceding, the invention, both as to organization and content, can be further understood and appreciated, along with other objects and features thereof, from the following detailed description and examples when taken in conjunction with the attached drawings.

DESCRIPTION OF THE PREFERRED EMBODIMENTS

Figure 1A:
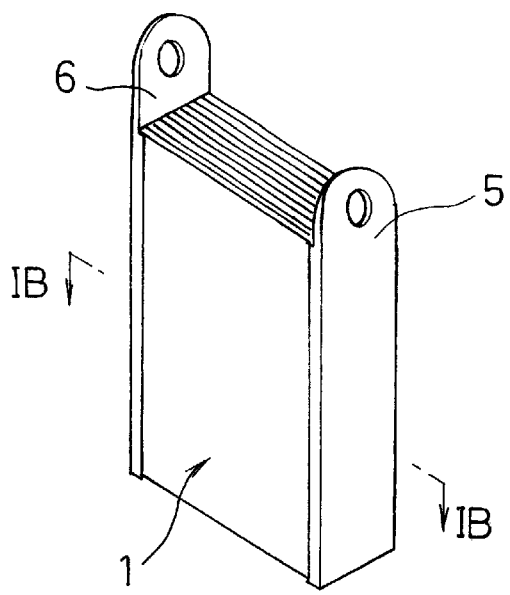
FIG. 1A is a perspective view and FIG. 1B is an enlarged cross sectional view taken along the line IB—IB in FIG. 1A, showing the electrode plate group of a prismatic battery according to one embodiment of the present invention.

A prismatic battery according to one embodiment of the present invention will be hereinafter described with reference to FIG. 1A, FIG. 1B, and FIG. 2.

The prismatic battery of this embodiment is a nickel metal hydride battery, and composed of an electrode plate group 1 accommodated together with liquid electrolyte within a prismatic battery case 11 having an open top end and a rectangular cross section. After inserting the electrode plate group 1 into the case, its open top end is closed by a lid (not shown) so as to be integral with the battery case 11. A plurality of such electrode plate groups 1 may be accommodated within a one-piece battery case having individual prismatic cells, sharing their separation walls, thereby to collectively form a rechargeable battery module.

The electrode plate group 1 is composed of a large number of positive electrode plates 2 and negative electrode plates 3 that are alternately stacked upon one another. The positive electrode plates 2 are covered with bag-shaped separators 4 having openings on one side, so that the separators 4 are interposed between each of the positive electrode plates 2 and negative electrode plates 3.

Figure 1B:
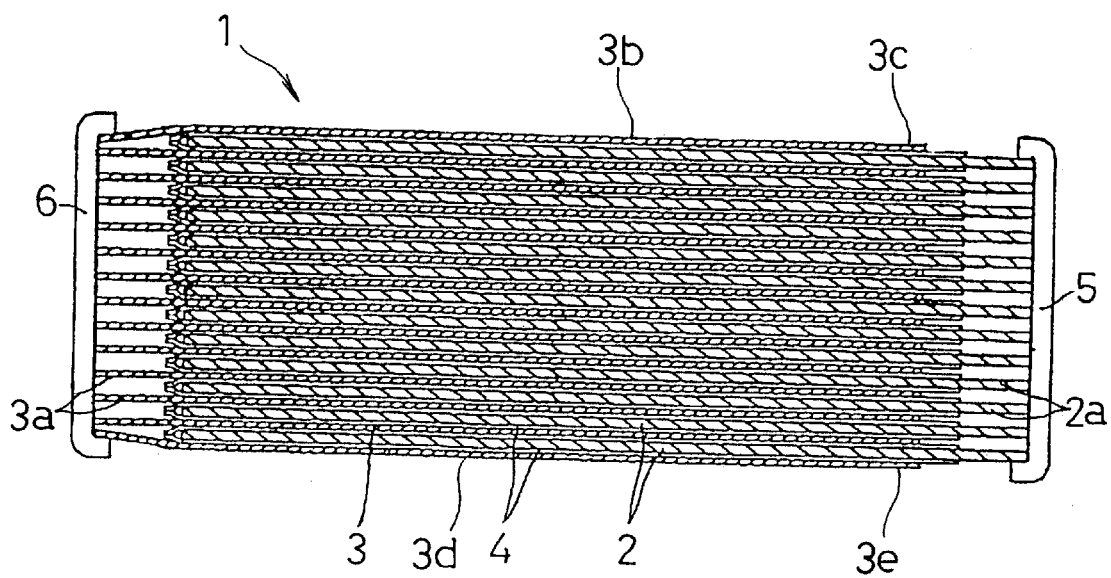
Figure 2:
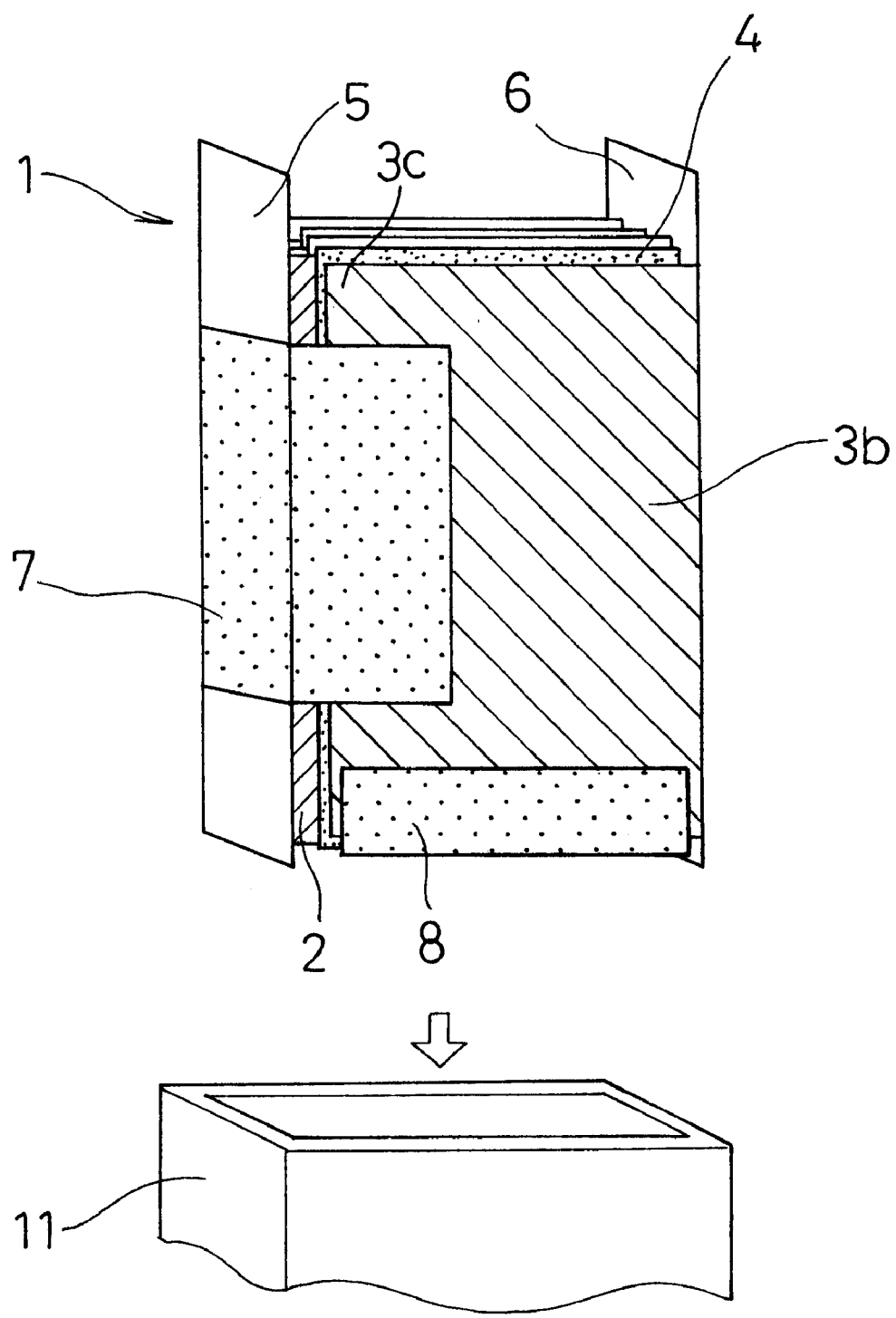
FIG. 2 is a perspective view showing the electrode plate group and part of a battery case of the prismatic battery of the invention.

As shown in FIG. 1B, the electrode plates 2, 3 are laterally offset from each other so that side edges on one side of the positive electrode plates 2 and those of the negative electrode plates 3 are protruded outwards in opposite directions, and these protruded side edges of the electrode plates constitute respective leads 2a, 3a. The positive electrode plates 2 are made of metal foam substrate containing Ni, and the leads 2a of the positive electrode plates are composed of the protruded side edges of compressed metal foam substrate, to one side of which lead plates are welded by seam welding or ultrasonic welding. The negative electrode plates 3 are made of perforated metal substrate of Ni, coated with active materials in the form of a paste, and the leads 3a of the negative electrode plates are composed of the protruded side edges (solid portions) of perforated metal substrate, which are not coated with the active material. A positive collector plate 5, and a negative collector plate 6 made of nickel sheet or nickel-plated steel sheet are abutted perpendicularly on the leads 2a, 3a of the positive and negative electrode plates 2, 3, respectively, and joined thereto by welding.

As can be seen from FIG. 1B, the outermost negative electrode plates 3b, 3d have loose ends 3c, 3e and tend to spread out. Therefore, a holding tape 7 is attached to the electrode plate group 1, stretching from the vicinity of the loose end 3c of one outermost negative electrode 3b over the outer face of the positive collector plate 5 to the vicinity of the loose end 3e of the other outermost negative electrode 3d as shown in FIG. 2. The holding tape 7 is an adhesive tape having a 0.10 mm thick polypropylene film coated with rubber-based adhesive agent. In the illustrated example, the holding tape 7 has a width smaller than the height of the electrode plates so that the upper and lower ends of the electrode plate group 1 are left exposed. Instead, the holding tape 7 may have a width covering the entire length of the electrode plate group 1, or alternatively, a plurality of narrower, spaced tapes may be attached to the electrode plate group 1.

In addition to the holding tape 7, a protective tape 8, made of the same type of adhesive tape, is attached to the bottom end of the electrode plate group 1, stretching from the bottom end of one outermost negative electrode 3b over the bottom end face of the electrode plate group 1 to the bottom end of the other outermost negative electrode 3d. The protective tape 8 may have a width for entirely covering the electrode plates between the collector plates 5, 6.

Figure 3:
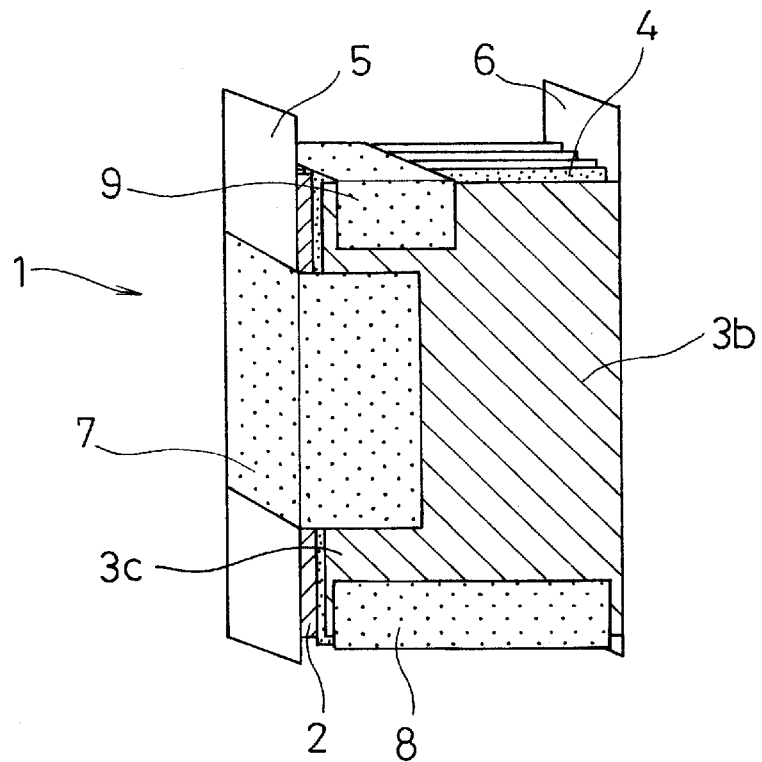
FIG. 3 is a perspective view showing a modified example of the electrode plate.

An additional protective tape 9 may further be attached to the electrode plate group 1 on the top end thereof, as shown in FIG. 3.

According to the prismatic battery of this embodiment, the loose ends 3c, 3e of the outermost negative electrode plates 3b, 3d are secured to the positive collector plate 5 by the holding tape 7 and prevented from spreading out. Accordingly, no foreign substances can enter between the electrode plates prior to insertion thereof into the battery case 11, whereby the risk of the formation of short circuits is eliminated. Both loose ends 3c, 3e of the outermost negative electrode plates 3b, 3d are thus secured by the holding tape 7 stretching over one side of the electrode plate group 1 such as to be U-form in cross section, whereby the length of the tape is made minimum.

The protective tape 8 is bonded to the bottom end of the electrode plate group 1, so that the outermost negative electrode plates 3b, 3d are duly protected when the electrode plate group 1 is inserted into the battery case 11, thereby eliminating the risk that the active material coated on the electrode plates is scraped by the open end edge of the battery case 11.

Figure 4:
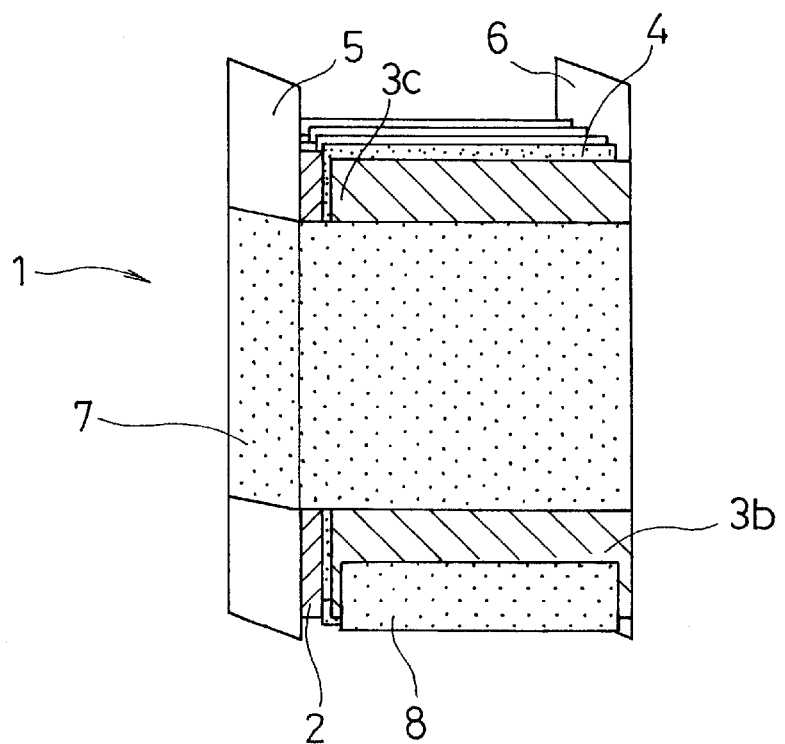
FIG. 4 is a perspective view showing another modified example of the electrode plate.

FIG. 4 illustrates a modification to the above-described embodiment of the invention. As shown, the holding tape 7 is wound entirely around both collector plates 5, 6 and the outermost negative electrode plates 3b, 3d. The protective tape 8 is bonded from the bottom end of one outermost negative electrode 3b over the bottom face of the electrode plate group 1 to the other outermost negative electrode plate 3d. In this way, the outer surface of the outermost negative electrodes 3b, 3d are entirely covered and protected by the holding tape 7.

Figure 5:
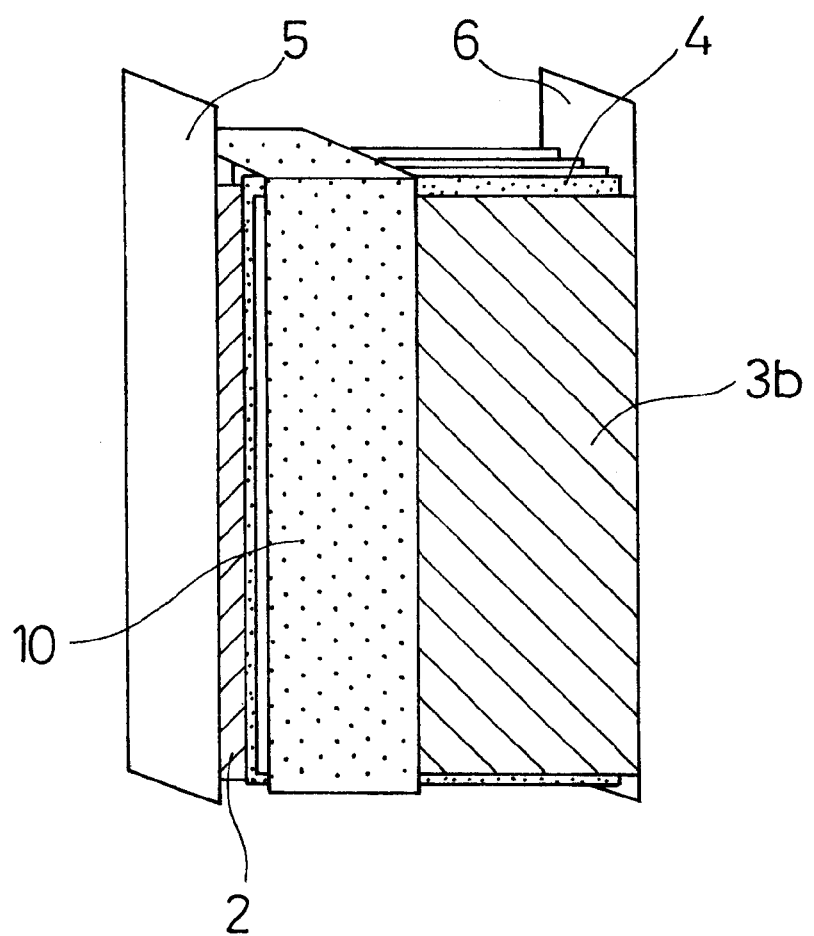
FIG. 5 is a perspective view showing an electrode plate of a prismatic battery according to another embodiment of the invention.
Figure 6:
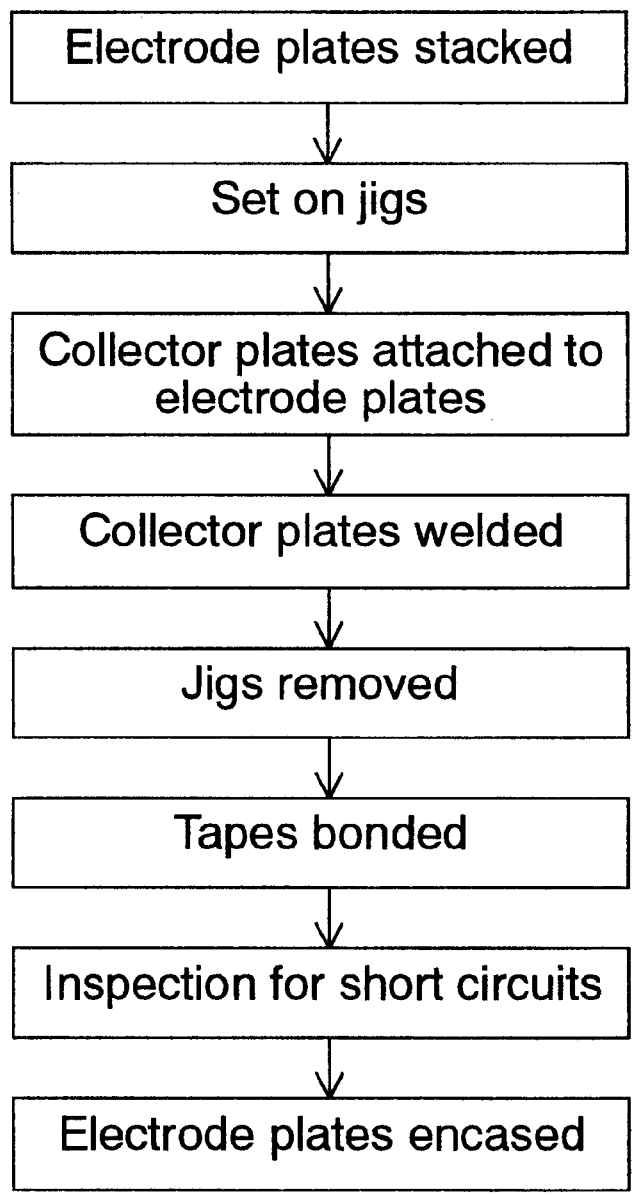
FIG. 6 is a flow chart of a method for manufacturing prismatic batteries according to the invention.

FIG. 5 shows a prismatic battery according to another embodiment of the invention. As shown, a holding tape 10 is vertically wound around the electrode plate group 1 so as to cover the loose ends 3c, 3e of the outermost negative electrodes 3b, 3d, thereby also serving as a protective tape. In this way, the loose ends 3c, 3e of the negative electrodes 3b, 3d are securely held so as to prevent any foreign substances from entering between the electrode plates, and also, the bottom end of the electrode plate group 1 is duly protected when inserting same into the battery case 11.

Next, the process for assembling the prismatic battery according to the invention will be described with reference to FIG. 6 through FIG. 9.

Figure 7:
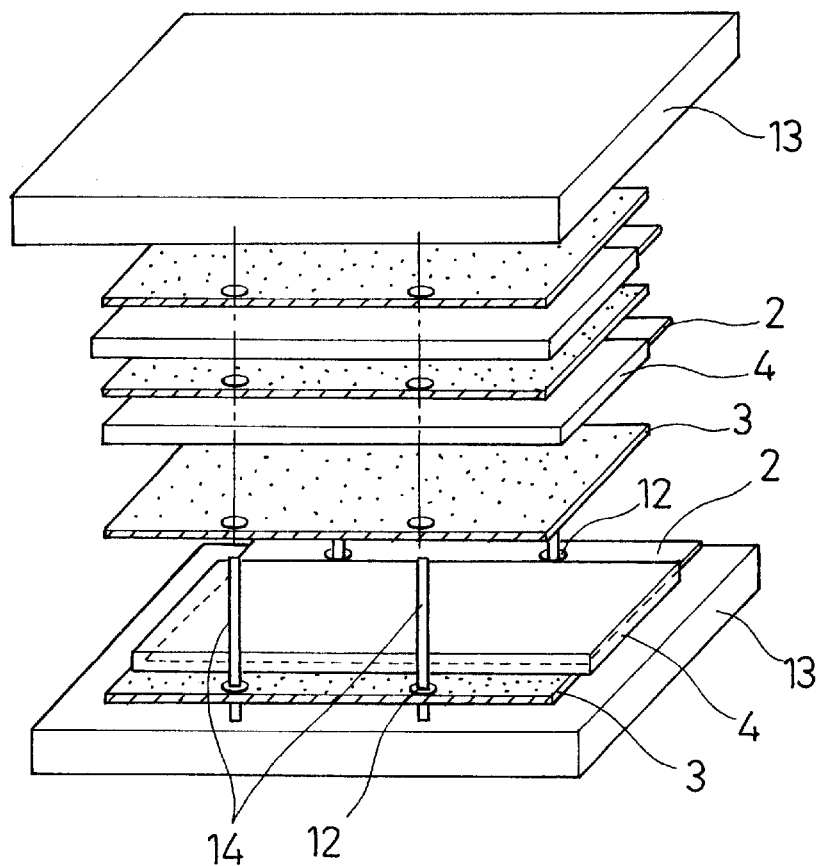
FIG. 7 is a perspective view showing one process step of manufacturing the electrode plate group.

First, a number of positive electrodes 2 covered with bag-shaped separators 4 and a number of negative electrodes 3 are alternately stacked upon one another using stacking jigs 13 shown in FIG. 7. In the drawings, only a small number of respective electrode plates are shown for simplicity. The positive and negative electrode plates 2, 3 are respectively formed with holes 12 along one side edge thereof, whereas positioning pins 14 are correspondingly provided to stacking jigs 13 as shown in FIG. 7. In stacking the electrode plates, positioning is achieved by passing these positioning pins 14 through the holes 12 in the respective electrode plates 2, 3. The group of stacked electrode plates is then set on an assembling jig (not shown) for the purpose of assembling collector plates 5, 6 thereto.

Figure 8:
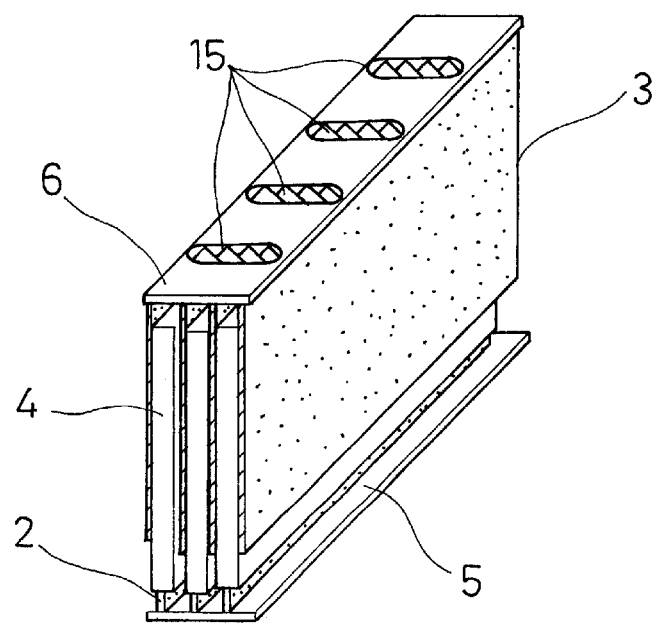
FIG. 8 is a perspective view showing a process step for welding a collector plate.

The collector plates 5, 6 are abutted on both sides of the group of electrode plates and welded to the side edges of the positive and negative electrode plates, respectively. In welding the collector plates 5, 6 to the electrode plate group, heat is applied by irradiation of electronic beams or the like on the collector plates in a plurality of lines along the direction in which the electrode plates are stacked, as shown in FIG. 8, so that the collector plates 5, 6 are joined to the side edges of the positive and negative electrode plates at several welding lines 15.

The assembling jigs are then removed from the electrode plate group, and a holding tape 7 and/or a protective tape 8 is/are bonded to the electrode plate group.

Figure 9:
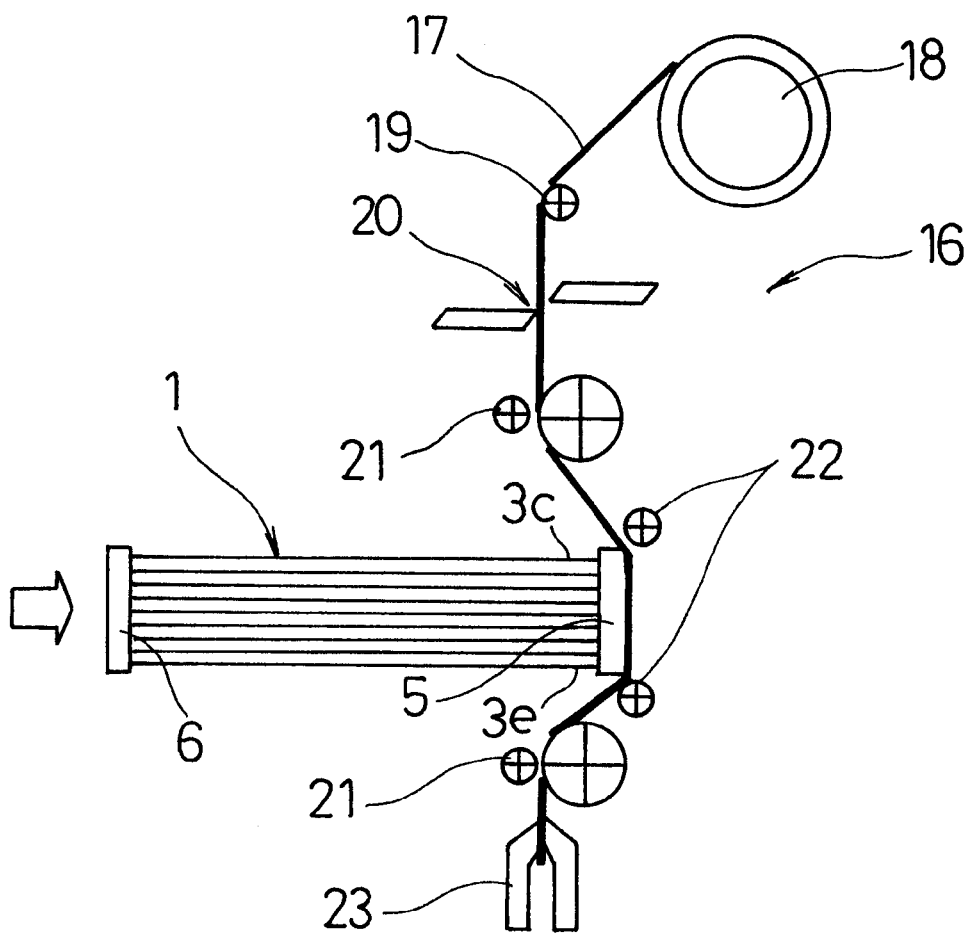
FIG. 9 is a side view showing a process step for bonding a tape.

The tapes 7, 8 are bonded to the electrode plate group 1 by a mechanism 16 shown in FIG. 9. Referring to FIG. 9, a tape 17 such as the holding tape 7 or protective tape 8 is rolled out from a reel 18, guided by a guide roller 19, and cut to a prescribed length by a cutter 20. The tape 17 is stretched between a pair of holding rollers 21, 21, and bonded to the electrode plate group 1 by bonding rollers 22. Reference numeral 23 denotes a clamp for drawing out the tape 17.

Bonding of the tape is carried out in the following manner. First, the tape 17 is stretched straight under tension between the two holding tapes 21, 21. The electrode plate group 1 is arranged perpendicular with respect to the stretched tape 17 and pushed towards the tape 17 as indicated by the arrow in FIG. 9 until the positive collector plate 5 of the electrode plate group 1 makes tight contact with the tape 17. When the tape is securely bonded to the collector plate 5, the cutter 20 operates and the clamp 23 releases the hold of the tape 17. Thereafter, the electrode plate group 1 is further pushed forward, whereby the pair of bonding rollers 22 cause the tape 17 to adhere to the loose ends 3c, 3e of the outermost negative electrodes 3b, 3d on both sides of the electrode plate group 1. Thus the holding tape 7 is attached to one side of the electrode plate group 1. The protective tape 8 can similarly be bonded to the bottom end of the electrode plate group 1.

Upon completing the bonding of the holding tape 7 or the protective tape 8, the electrode plate group is inspected for short circuits, and if it passes the test, the electrode plate group 1 is housed within the battery case 11. The battery case is then filled with liquid electrolyte and is sealed by a lid, thereby completing a prismatic battery.

Comparison was made between the prismatic batteries of the invention manufactured as described above and conventional batteries in which no tape is provided with respect to the proportion of short circuits found in electrode plate groups and the proportion of defects that occurred during the insertion of electrode plate groups into battery cases. The results are shown in Table 1.

TABLE 1

| | Proportion of short-circuiting defects | Proportion of defects during insertion of electrode plates into cases |
| --- | --- | --- |
| Present invention | 0/100 | 0/100 |
| Prior Art | 4/100 | 5/100 |

As can be seen from Table 1, while short-circuiting faults and failure during the insertion of electrode plates into battery cases occurred at a rate between 4 to 5% in prior art batteries, no such defects were found in batteries according to the present invention. Thus it was ascertained that the invention is effective to prevent internal short circuits and other defects.

Instead of adhesive tapes, the electrode plate groups may be covered with a non-conductive film such as a heat-shrinkable tube or the like for achieving the same effects.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A prismatic battery, comprising:
   a battery case for accommodating an electrode plate group and a liquid electrolyte therein, the electrode plate group including
   a plurality of positive electrode plates and a plurality of negative electrode plates stacked alternately with intervening separators therebetween, the positive electrode plates and the negative electrode plates being laterally offset so that side edges of the positive electrode plates and the negative electrode plates protrude respectively on opposite sides of the electrode plate group, and
   collector plates joined perpendicularly to the side edges of the positive electrode plates and the negative electrode plates on both sides of the electrode plate group, wherein
   a loose end of a positive or negative electrode plate positioned outermost of the electrode plate group is covered with a non-conductive film.

2. A prismatic battery, comprising:
   a battery case for accommodating an electrode plate group and a liquid electrolyte therein, the electrode plate group including
   a plurality of positive electrode plates and a plurality of negative electrode plates stacked alternately with intervening separators therebetween, the positive electrode plates and the negative electrode plates being laterally offset from each other so that side edges of the positive electrode plates protrude on one side and side edges of the negative electrode plates protrude on the other side of the electrode plate group,
   a first collector plate joined perpendicularly to the side edges of the positive electrode plates on one side of the electrode plate group,
   a second collector plate joined perpendicularly to the side edges of the negative electrode plates on the other side of the electrode plate group, and
   a tape attached to part of the electrode plate group, the tape at least bridging a loose end of an electrode plate positioned outermost of the electrode plate group and one of the first collector plate and the second collector plate.

3. The prismatic battery according to claim 2, wherein the tape stretches from the loose end of the outermost electrode plate on one side of the electrode plate group over one of the first and second collector plates to the loose end of the outermost electrode plate on the other side of the electrode plate group.

4. The prismatic battery according to claim 3, further comprising a second tape attached to the electrode plate group in the vicinity of the loose end of the outermost electrode plate, stretching from a bottom end of one outermost electrode plate over a bottom end face of the electrode plate group to a bottom end of the other outermost electrode plate.

5. The prismatic battery according to claim 2, wherein the tape is wound around the electrode plate group to surround the outermost electrode plates and the collector plates.

6. The prismatic battery according to claim 5, further comprising a second tape attached to the electrode plate group in the vicinity of the loose end of the outermost electrode plate, stretching from a bottom end of one outermost electrode plate over a bottom end face of the electrode plate group to a bottom end of the other outermost electrode plate.

7. A prismatic battery, comprising:
   a battery case for accommodating an electrode plate group and a liquid electrolyte therein, the electrode plate group including
   a plurality of positive electrode plates and a plurality of negative electrode plates stacked alternately with intervening separators therebetween, the positive electrode plates and the negative electrode plates being laterally offset from each other so that side edges of the positive electrode plates protrude on one side and side edges of the negative electrode plates protrude on the other side of the electrode plate group,
   a first collector plate joined perpendicularly to the side edges of the positive electrode plates on one side of the electrode plate group, a second collector plate joined perpendicularly to the side edges of the negative electrode plates on the other side of the electrode plate group, and a tape wound vertically around the electrode plate group at a location covering a loose end of an electrode plate positioned outermost of the electrode plate group.

8. A method for manufacturing a prismatic battery, comprising:

stacking a plurality of positive electrode plates and a plurality of negative electrode plates alternately with intervening separators therebetween to constitute an electrode plate group such as to laterally offset from each other so that side edges of the positive electrode plates protrude on one side and side edges of the negative electrode plates protrude on the other side of the electrode plate group;

joining collector plates perpendicularly to the respective side edges of the positive electrode plates and the negative electrode plates of the electrode plate group;

covering part of electrode plates positioned outermost of the electrode plate group with either one of a film or a bonding tape;

subjecting the electrode plate group to inspection for short circuits; and inserting the electrode plate group into a battery case.

* * * * *